US008771158B2

(12) United States Patent
Moriguchi et al.

(10) Patent No.: US 8,771,158 B2
(45) Date of Patent: Jul. 8, 2014

(54) HORIZONTAL MACHINING CENTER

(75) Inventors: Kazutoyo Moriguchi, Yamatokoriyama (JP); Yoshiaki Azuma, Yamatokoriyama (JP); Naoaki Yoshizato, Yamatokoriyama (JP)

(73) Assignee: DMG Mori Seiki Co., Ltd., Yamatokoriyama-shi (JP)

( * ) Notice: Subject to any disclaimer, the term of this patent is extended or adjusted under 35 U.S.C. 154(b) by 457 days.

(21) Appl. No.: 13/219,932

(22) Filed: Aug. 29, 2011

(65) Prior Publication Data

US 2012/0053030 A1    Mar. 1, 2012

(30) Foreign Application Priority Data

Aug. 31, 2010 (JP) ................................. 2010-194058

(51) Int. Cl.
*B23Q 3/157* (2006.01)
(52) U.S. Cl.
CPC ................................. *B23Q 3/15706* (2013.01)
USPC ............................................ 483/56; 483/68
(58) Field of Classification Search
CPC .................................................. B23Q 3/15706
USPC ......................................... 483/54–57, 61, 68
See application file for complete search history.

(56) References Cited

U.S. PATENT DOCUMENTS

| 3,241,451 | A  | * | 3/1966 | Williamson | 409/80 |
| 3,709,623 | A  | * | 1/1973 | Stephan et al. | 483/54 |
| 4,012,818 | A  | * | 3/1977 | Dornbluth et al. | 483/55 |
| 5,762,594 | A  | * | 6/1998 | Hoppe | 483/56 |
| 6,740,839 | B1 | * | 5/2004 | Kung et al. | 219/69.11 |
| 2005/0143236 | A1 | * | 6/2005 | Nakazawa et al. | 483/54 |

FOREIGN PATENT DOCUMENTS

| GB | 2167325 A | * | 5/1986 |
| JP | 48-60370 | | 8/1973 |
| JP | 58-94951 | | 6/1983 |

* cited by examiner

*Primary Examiner* — Erica E Cadugan
(74) *Attorney, Agent, or Firm* — Oblon, Spivak, McClelland, Maier & Neustadt, L.L.P.

(57) ABSTRACT

A horizontal machining center includes: a table driven in first and second directions (directions indicated by arrows 530*p* and 530*q*, respectively) allowing the table to approach and move away from a spindle, respectively; a magazine having a plurality of tool gripping claws; and a coupling mechanism for coupling the table and the magazine together and moving the magazine in one of the first and second directions when the table is driven in the other of the first and second directions. When a tool attached to the spindle is removed from the spindle, the table is driven in the first direction, and when a tool accommodated by the magazine is attached to the spindle, the table is driven in the second direction. A horizontal machining center having a simple structure and prevented from having a bulky structure can thus be accomplished.

3 Claims, 9 Drawing Sheets

HORIZONTAL MACHINING CENTER

BACKGROUND OF THE INVENTION

1. Field of the Invention

The present invention relates generally to a horizontal machining center, and particularly to a horizontal machining center having a column, a spindle head and a table sliding in X-, Y- and Z-axes, respectively.

2. Description of the Background Art

For a conventional horizontal machining center, for example Japanese Patent Laying-open No. 48-60370 discloses a machine tool equipped with an automatic tool exchange device exchanging tools in a short period of time and also having a simple structure to help its fabrication. The machine tool disclosed in Japanese Patent Laying-open No. 48-60370 has a magazine body adapted to be movable by a magazine driving hydraulic cylinder in a direction parallel to a spindle's centerline. When the spindle has a tool to be exchanged, the spindle head moves to allow the tool to be inserted into an available gripping device of the magazine. When the spindle has the tool disengaged therefrom, the hydraulic cylinder is driven to move the magazine body forward to draw the tool out of the spindle.

Furthermore, Japanese Patent Laying-open No. 58-94951 discloses a machine tool intended to remove a possibility of having swarf adhering on a fitting surface of a tool and increase a table's feed rate. When the machine tool disclosed in Japanese Patent Laying-open No. 58-94951 has a tool to be exchanged, a tool magazine body is placed on a tool magazine support formed at the table and is also clamped to the table. In this condition, the table is moved toward a spindle head to position the magazine body immediately under a spindle. The tool on the spindle is inserted into a tool holder provided at the magazine body and the tool holder descends to draw the tool out of the spindle.

A variety of structures are proposed for an auto tool changer (ATC) for automatically exchanging a tool attached to a spindle with a tool accommodated in a magazine. For example, Japanese Patent Laying-open No. 48-60370 discloses a machine tool allowing a magazine per se to be moved to draw/insert a tool out of/into a spindle. Such a structure entails a driving source for moving the magazine, and the machine tool disclosed in Japanese Patent Laying-open No. 58-94951 allows the magazine to be moved by a driving source that also serves as a driving source for moving a table to achieve a simplified structure and a reduced cost.

In exchanging tools, it is necessary to move the table as far from the spindle as possible to prevent the spindle and a workpiece on the table from interfering with each other. If a horizontal machining center includes a spindle moving on a bed along X- and Y-axes and a table moving along a Z-axis, then, in exchanging tools, the table is positioned in general at a point on the Z-axis that is remotest from the spindle, i.e., the origin of the Z-axis. For this reason, when the table's driving source is utilized to exchange tools, as disclosed in Japanese Patent Laying-open No. 58-94951, it is necessary to move the table further away from the origin of the Z-axis. In doing so, if the table is moved away from the spindle to be farther than the origin of the Z-axis, the table's Z-axis travel must be set to be longer than original, resulting in the horizontal machining center having a bulky structure.

SUMMARY OF THE INVENTION

The present invention has been made to overcome the above disadvantage and it contemplates a horizontal machining center having a simple structure and prevented from having a bulky structure.

The present horizontal machining center includes: a spindle rotating a tool about a horizontal, predetermined axis; a table for securing a workpiece; a magazine for accommodating tools; and a coupling mechanism for coupling the table and the magazine together. The spindle is driven in a plane orthogonal to the predetermined axis. The table is driven in first and second directions parallel to the predetermined axis to approach and move away from the spindle, respectively. The magazine has a plurality of grippers capable of gripping the tools. The magazine is movable in a direction parallel to the predetermined axis. The coupling mechanism moves the magazine in one of the first and second directions when the table is driven in the other of the first and second directions. When a tool attached to the spindle is removed from the spindle, the tool attached to the spindle is gripped by a gripper, and in that condition, the table is driven in the first direction. When a tool accommodated by the magazine is attached to the spindle, the tool, gripped by a gripper, is positioned on the predetermined axis, and in that condition, the table is driven in the second direction.

The horizontal machining center thus configured allows tools to be exchanged while the coupling mechanism operates to gang the magazine and the table together in moving them. This can eliminate the necessity of introducing an additional driving source for sliding the magazine in the direction parallel to the predetermined axis, and the horizontal machining center can have a simple structure. In doing so, as the table is driven in a direction, the magazine is moved in an opposite direction, and moving the magazine away from the spindle, or in the second direction, to remove a tool attached to the spindle from the spindle can be done simply by moving the table to approach the spindle, or in the first direction. It is no longer necessary to drive the table for an increased distance for exchanging tools, and the horizontal machining center can thus be prevented from having a bulky structure.

Preferably, the magazine further has an annular chain coupling the plurality of grippers together and rotatably driven, and a plurality of chain supporting mechanisms for supporting the chain. The plurality of chain supporting mechanisms include at least one sprocket having the chain wound thereon. The plurality of chain supporting mechanisms have at least one thereof disposed in a vicinity of a tool exchange position of the spindle. As seen along the predetermined axis, the chain supporting mechanism disposed in the vicinity of the tool exchange position of the spindle supports the chain to have a portion projecting toward the spindle.

In the horizontal machining center thus configured, the chain supporting mechanism disposed in the vicinity of the tool exchange position of the spindle can support the chain to have a portion disposed more adjacent to the spindle. This allows tools to be exchanged in a reduced period of time.

Preferably, the horizontal machining center further includes: a bed set on a plane bearing the horizontal machining center thereon, and having the spindle and table mounted thereon; and a guiding mechanism attached to the bed and supporting the magazine movably in a direction parallel to the predetermined axis.

The horizontal machining center thus configured can have the magazine attached via the guiding mechanism to the bed directly and hence disposed more adjacent to the spindle. This allows tools to be exchanged in a reduced period of time. Furthermore, a reduced number of components can also be achieved.

The present invention can thus provide a horizontal machining center having a simple structure and prevented from having a bulky structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiment will be described with reference to the drawings. In the figures, identical or corresponding components are identically denoted.

Figure 1:
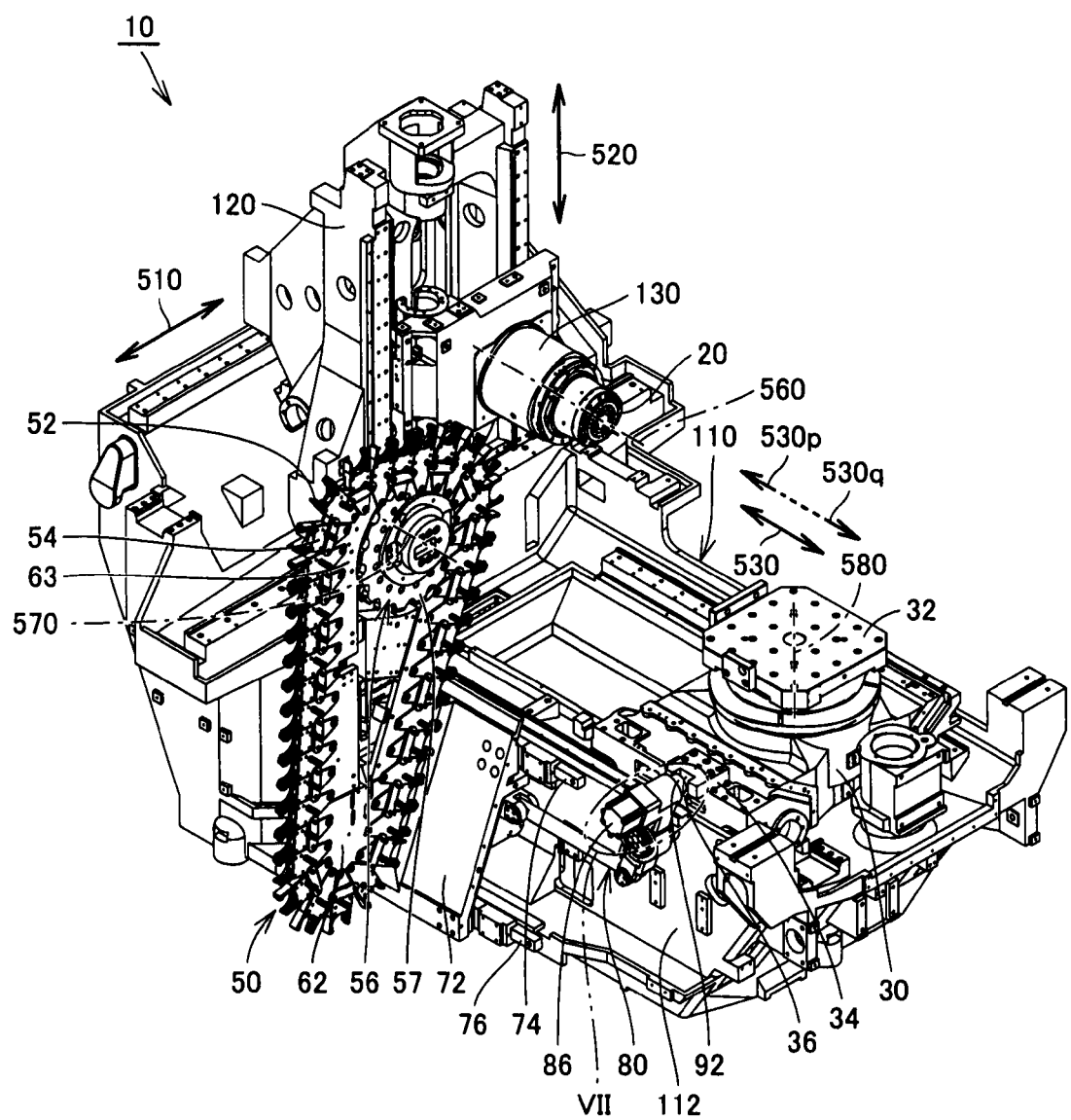
FIG. 1 is a perspective view of a horizontal machining center in an embodiment of the present invention.
Figure 2:
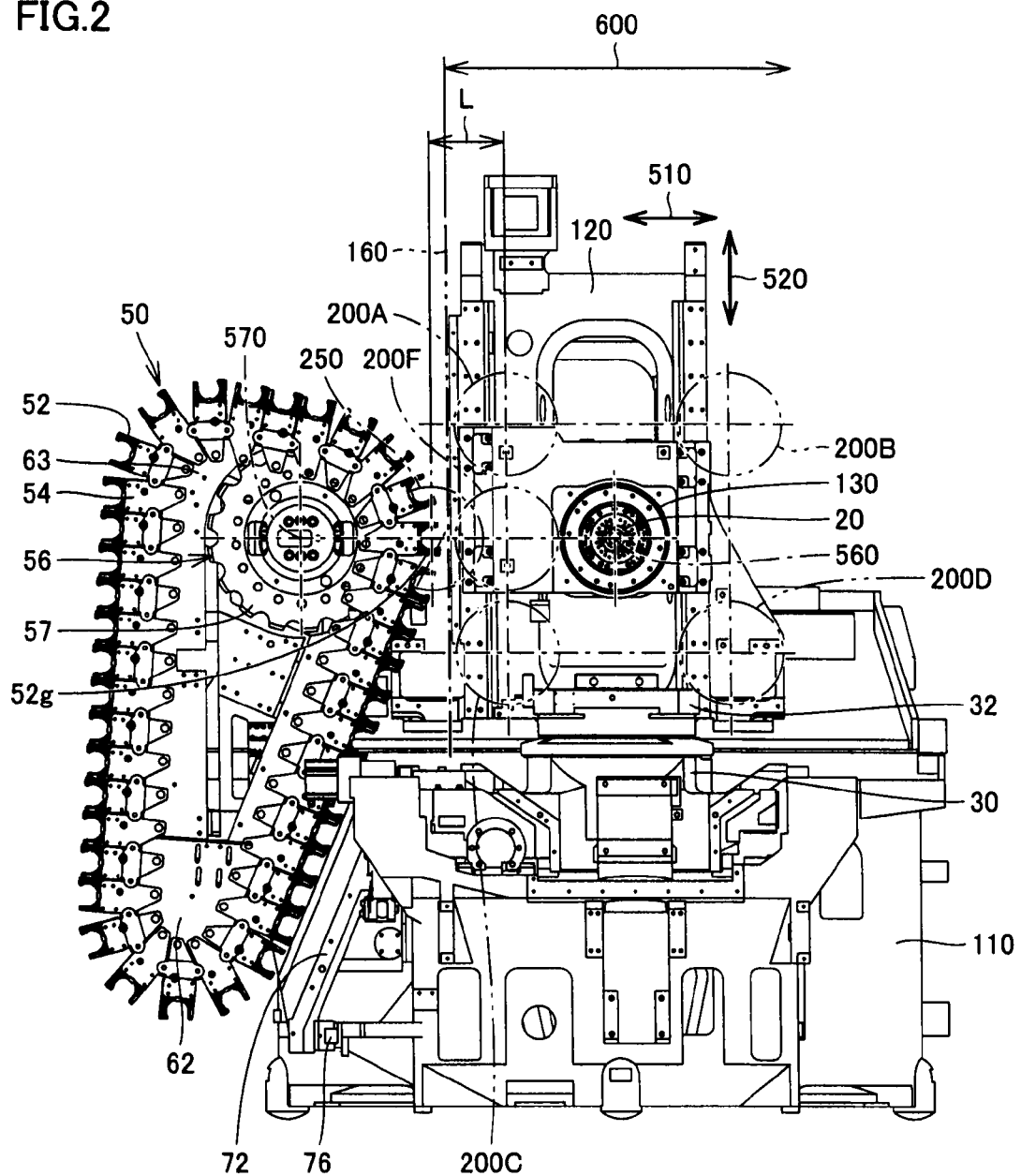
FIG. 2 is a front view of the FIG. 1 horizontal machining center.
Figure 3:
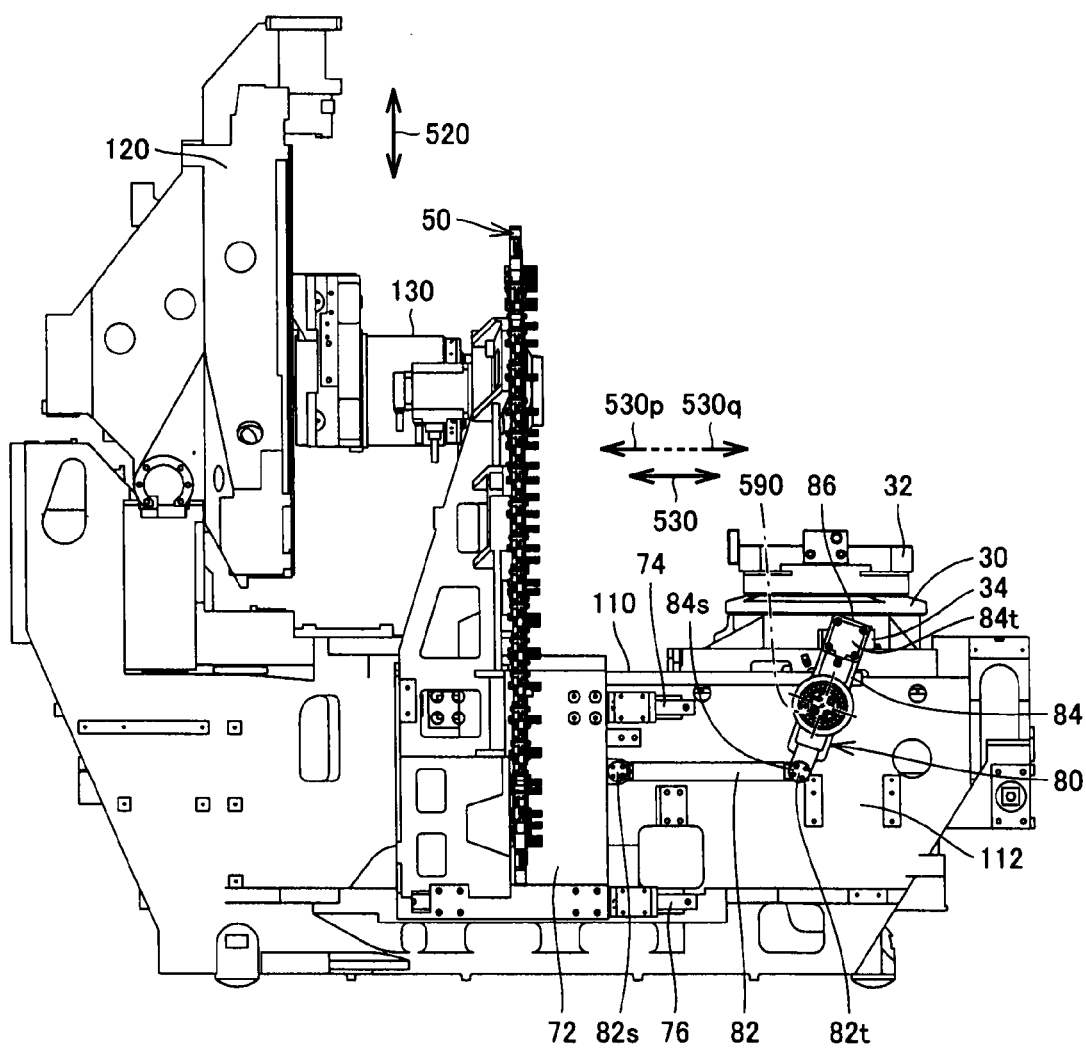
FIG. 3 is a side view of the FIG. 1 horizontal machining center.
Figure 4:
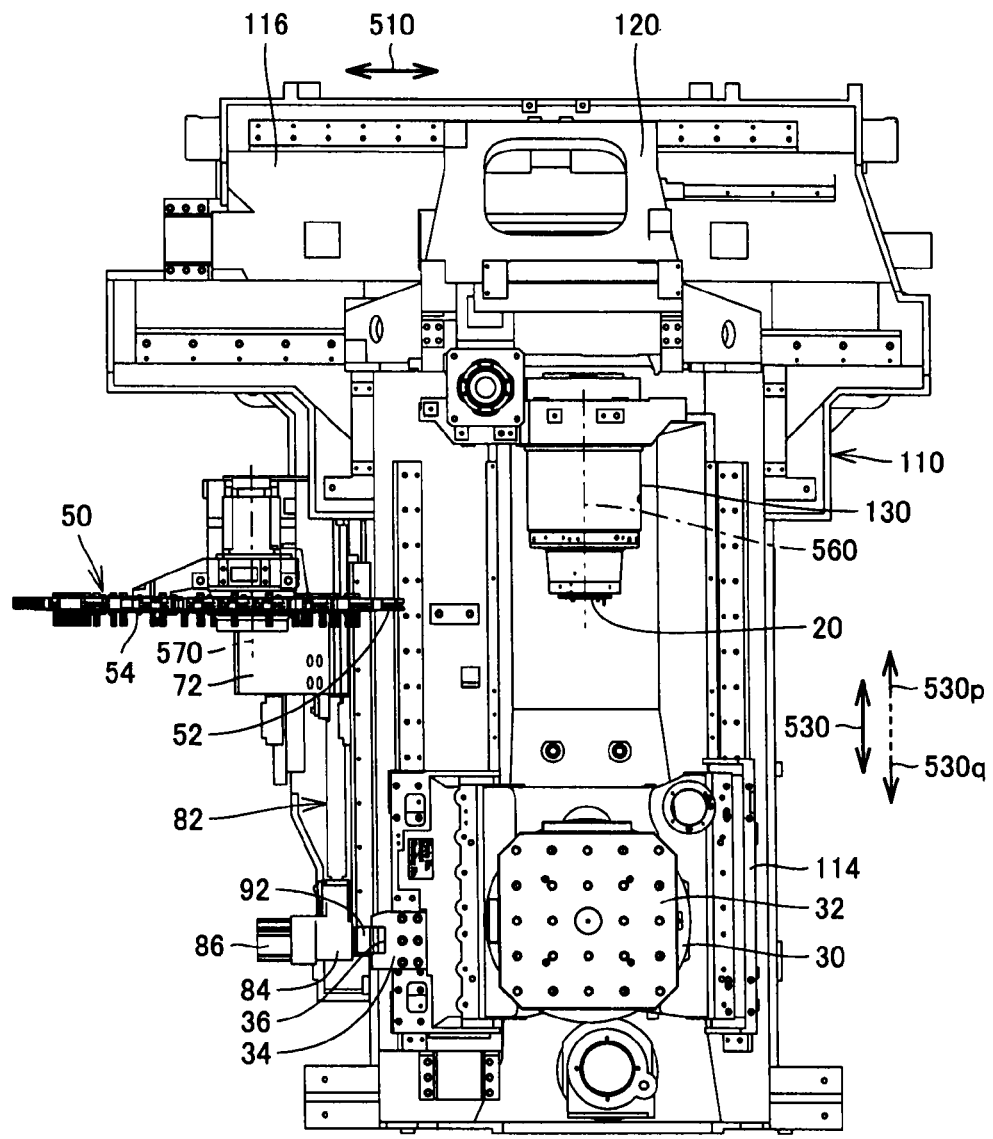
FIG. 4 is a plan view of the FIG. 1 horizontal machining center.

FIG. 1 is a perspective view of a horizontal machining center in an embodiment of the present invention. FIG. 2 is a front view of the FIG. 1 horizontal machining center. FIG. 3 is a side view of the FIG. 1 horizontal machining center. FIG. 4 is a plan view of the FIG. 1 horizontal machining center.

With reference to FIGS. 1-4, the present embodiment provides a horizontal machining center 10 having a basic structure, as will be described hereinafter. Horizontal machining center 10 has as its main components a bed 110, a column 120, a spindle head 130, and a table 30.

Bed 110 is a base member for mounting column 120, spindle head 130, table 30 and the like thereon, and set on an installation plane in a factory or the like. Bed 110 has column 120 attached thereto. Column 120 is provided on bed 110 to rise from a top surface of bed 110. Column 120 is provided slidably relative to bed 110 in an axial direction indicated by an arrow 510 (or along an X-axis).

Spindle head 130 is attached to column 120. Spindle head 130 is provided slidably relative to column 120 in an axial direction indicated by an arrow 520 (or along a Y-axis). Table 30 is attached to bed 110. Table 30 is provided slidably relative to bed 110 in an axial direction indicated by an arrow 530 (or along a Z-axis).

Column 120 and table 30 travel along the X- and Z-axes, respectively, which extend horizontally, and spindle head 130 travels along the Y-axis, which extends vertically. The X-, Y- and Z-axes are three orthogonal axes extending to be orthogonal to one another.

Column 120, spindle head 130 and table 30 are provided with a feeding mechanism, a guiding mechanism, a driving source in the form of a servo motor, and the like, as appropriate, to be capable of sliding along the X-, Y- and Z-axes, respectively. Horizontal machining center 10 basically has column 120, spindle head 130 and table 30 slid to provide movements, which are combined together to allow a tool attached to a spindle 20 to machine a workpiece at a position varying three dimensionally, as will be described hereinafter.

Spindle head 130 has spindle 20. Spindle 20 is driven by a motor rotatably about a horizontally extending center axis 560. Center axis 560 extends parallel to the axial direction indicated by arrow 530 (i.e., the Z-axis). A tool for machining a workpiece is attached to spindle 20. As spindle 20 rotates, the tool attached to spindle 20 rotates about center axis 560.

Spindle 20 moves in the X-Y plane orthogonal to center axis 560 as column 120 and spindle head 130 slide and thus move along the X- and Y-axes, respectively. In doing so, as shown in FIG. 2, spindle 20 moves within a range surrounded by positions 200A-200B-200C-200D indicated by a chain double-dashed line, while the workpiece is machined. Between a workpiece machining area 600 and a magazine 50, which will be described later, a movable shutter 160 is provided.

Figure 5:
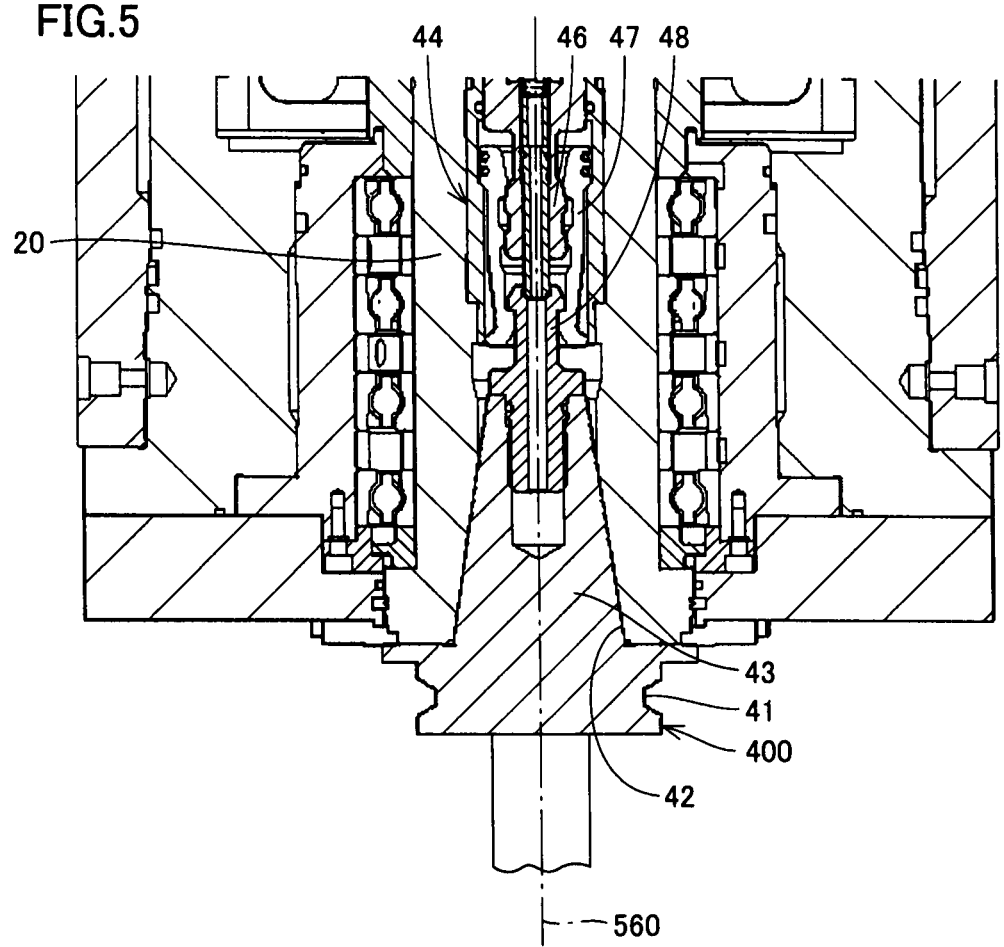
FIG. 5 is a cross section of a spindle provided at a headstock shown in FIG. 1.

FIG. 5 is a cross section of a spindle provided at a headstock shown in FIG. 1.

With reference to FIG. 5, spindle 20 is a cylinder. Inside spindle 20 is formed a tapered face 42 opening at an end face of the spindle. As seen in a plane orthogonal to center axis 560, tapered face 42 is formed to provide a diameter increasing as it approaches the end face of the spindle along center axis 560.

Spindle head 130 further has a clamp mechanism 44 for gripping a tool at spindle 20. Clamp mechanism 44 is provided inside spindle 20. Clamp mechanism 44 is provided on center axis 560.

More specifically, clamp mechanism 44 is configured with a collet 47 and a collet opening/closing member 46. Collet 47 has a claw capable of engagement with a pull stud bolt 48 provided at a tool 400, as will be described later, and is disposed in the form of a hollowed cylinder about center axis 560. Collet opening/closing member 46 is provided internal to spindle 20 and movable along center axis 560. Collet opening/closing member 46 is disposed to have its tip accommodated inside collet 47. A drive device (not shown) utilizing hydraulic pressure, a spring's force, air pressure, or the like is operated to move collet opening/closing member 46 back and forth along center axis 560 and thus decrease/increase the diameter of collet 47.

Tool 400 has a shank 43 and pull stud bolt 48. When tool 400 is attached to spindle 20, shank 43 has a surface in contact with the spindle's tapered face 42 and receives a rotary torque transmitted from spindle 20. Shank 43 has a circumferential groove 41 having a generally V-letter cross section. Pull stud bolt 48 is connected to shank 43.

As collet 47 is reduced in diameter, pull stud bolt 48 is gripped by collet 47 and also drawn along center axis 560, and tool 400 is clamped to spindle 20. Furthermore, as collet 47 is increased in diameter, pull stud bolt 48 is released from collet 47 and tool 400 is unclamped from spindle 20. When tool 400 attached to spindle 20 is exchanged, it is necessary to move the unclamped tool 400 along center axis 560 and draw the tool out to the end face of the spindle.

Note that FIG. 5 shows clamp mechanism 44 having a structure and a tool having a specification, which are exemplary and not limited to the example shown in the figure.

With reference to FIGS. 1-4, a pallet 32 is detachably attached to table 30. Pallet 32 can be driven by a motor rotatably relative to table 30 about a vertically extending center axis 580. On table 30, a workpiece is fixed using an angle plate or clamping block or a variety of tools.

Horizontal machining center 10 is further provided with an auto pallet changer (APC) (not shown). When horizontal machining center 10 is seen in a plane, the auto pallet changer is located opposite to spindle 20 with table 30 interposed. Table 30 reciprocates along arrow 530 or the Z-axis in a direction indicated by an arrow 530*p* and a direction opposite thereto or a direction indicated by an arrow 530*q*. When table 30 moves in the direction indicated by arrow 530*p*, table 30 approaches spindle 20 and moves away from the auto pallet changer. When table 30 moves in the direction indicated by arrow 530*q*, table 30 moves away from spindle 20 and approaches the auto pallet changer.

In the present embodiment horizontal machining center 10 further has as its main components magazine 50 and a coupling mechanism 80. These components have a characteristic structure functioning as the ATC, structured as will be described hereinafter.

Magazine 50 has a function accommodating a plurality of tools. Magazine 50 is provided in the form of a chain and has a tool gripping claw 52, a chain 54, and a chain supporting mechanisms 56, 62, 63.

Tool gripping claw 52 has a form capable of gripping a tool and in the present embodiment a pair of resin claws utilizing a spring's force pinches the shank 43 circumferential groove 41 (see FIG. 5) to grip the tool. Chain 54 is circulated in an endless annulus in a plane orthogonal to arrow 530 or the Z-axis. Chain 54 is provided with a plurality of tool gripping claws 52 equidistantly.

Chain supporting mechanisms 56, 62, 63 are provided to support chain 54 circulated in the endless annulus. As shown in FIG. 2, chain supporting mechanisms 56, 62, 63 allow chain 54 to be circulated in the form of a triangle having chain supporting mechanisms 56, 62, 63 as vertexes. Chain supporting mechanism 56 is adjacent to workpiece machining area 600 with shutter 160 interposed. Chain supporting mechanism 56 is equal in level to workpiece machining area 600. Chain supporting mechanism 56 as seen along arrow 510 or the X-axis is closer to workpiece machining area 600 than chain supporting mechanisms 62, 63 are. Chain supporting mechanism 62 is lower in level than workpiece machining area 600. Chain supporting mechanism 62 is located at a lateral side of bed 110. Chain supporting mechanism 63 is located above chain supporting mechanism 62.

Chain supporting mechanism 56 has a sprocket 57. Sprocket 57 can be driven by a motor rotatably about a center axis 570. Center axis 570 extends in a direction parallel to arrow 530 or the Z-axis. As sprocket 57 rotates, chain 54 is circulated in a direction in which it is wound.

A portion of chain 54 that is supported by chain supporting mechanism 56 is wound on sprocket 57 and circulated in a direction varying as the portion is curved along a circumferential surface of sprocket 57. The portion of chain 54 that is supported by chain supporting mechanism 56 is laid out to project toward workpiece machining area 600. Chain supporting mechanisms 62, 63 also have sprockets (not shown), respectively, and chain 54 is wound on the sprockets at those vertexes of the triangle at which chain supporting mechanisms 62, 63 are provided.

With reference to FIG. 2, when the tool attached to spindle 20 is exchanged with another tool accommodated by magazine 50, spindle 20 is moved to a tool exchange position 250. In the present embodiment horizontal machining center 10 allows column 120 to travel along the X-axis a distance increased by a length L to allow spindle 20 to move to tool exchange position 250.

On the other hand, magazine 50 has an available tool gripping claw 52 positioned at a standby position to draw out the tool attached to spindle 20, and furthermore, has positioned at a standby position a tool gripping claw 52 gripping another tool to attach it to spindle 20. A standby position as referred to herein is a position overlapping tool exchange position 250 on the Z-axis and FIG. 2 shows a tool gripping claw 52*g* positioned at the standby position. Of the plurality of tool gripping claws 52, tool gripping claw 52*g* is positioned most adjacent to workpiece machining area 600. Tool gripping claw 52*g* is supported by a portion of chain 54 that is wound on sprocket 57.

With reference to FIGS. 1-4, magazine 50 further has a base implemented as a magazine base 72. Magazine base 72 supports tool gripping claw 52, chain 54, and chain supporting mechanisms 56, 62, 63.

In the present embodiment, horizontal machining center 10 has magazine 50 slidably along arrow 530 or the Z-axis. More specifically, horizontal machining center 10 further has a guiding mechanism implemented as linear guides 74, 76. Linear guides 74, 76 are attached to bed 110 and magazine base 72. Linear guides 74, 76 have their rails secured to bed 110 and a block of linear guides 74, 76 guided by the rails is secured to magazine base 72. Linear guides 74, 76 are attached to bed 110 to have their rails to extend along the Z-axis linearly.

Note that if a spacer, a liner or a similar plate member is used to positionally adjust linear guides 74, 76, the plate member is included by linear guides 74, 76 serving as the guiding mechanism.

As shown in FIG. 4, bed 110 has a plan view generally in the form of a letter T formed of a combination of a column support 116 and a table support 114. Column support 116 extends along arrow 510 or the X-axis and supports column 120 and spindle head 130 attached to column 120. Table support 114 extends from column support 116 along arrow 530 or the Z-axis and supports table 30.

Bed 110 has a side face 112. Side face 112 is formed to rise upward from the plane on which horizontal machining center 10 is installed. Side face 112 is located at table support 114. Linear guides 74, 76 are attached to side face 112. Magazine 50 is disposed at a step formed by column support 116 and table support 114, as seen in a plan view.

Note that while in the present embodiment magazine 50 is slidably supported by a guiding mechanism implemented as linear guides 74, 76, it may alternatively be supported by a slidably guiding mechanism or a linear motion mechanism other than the linear guide.

Figure 6:
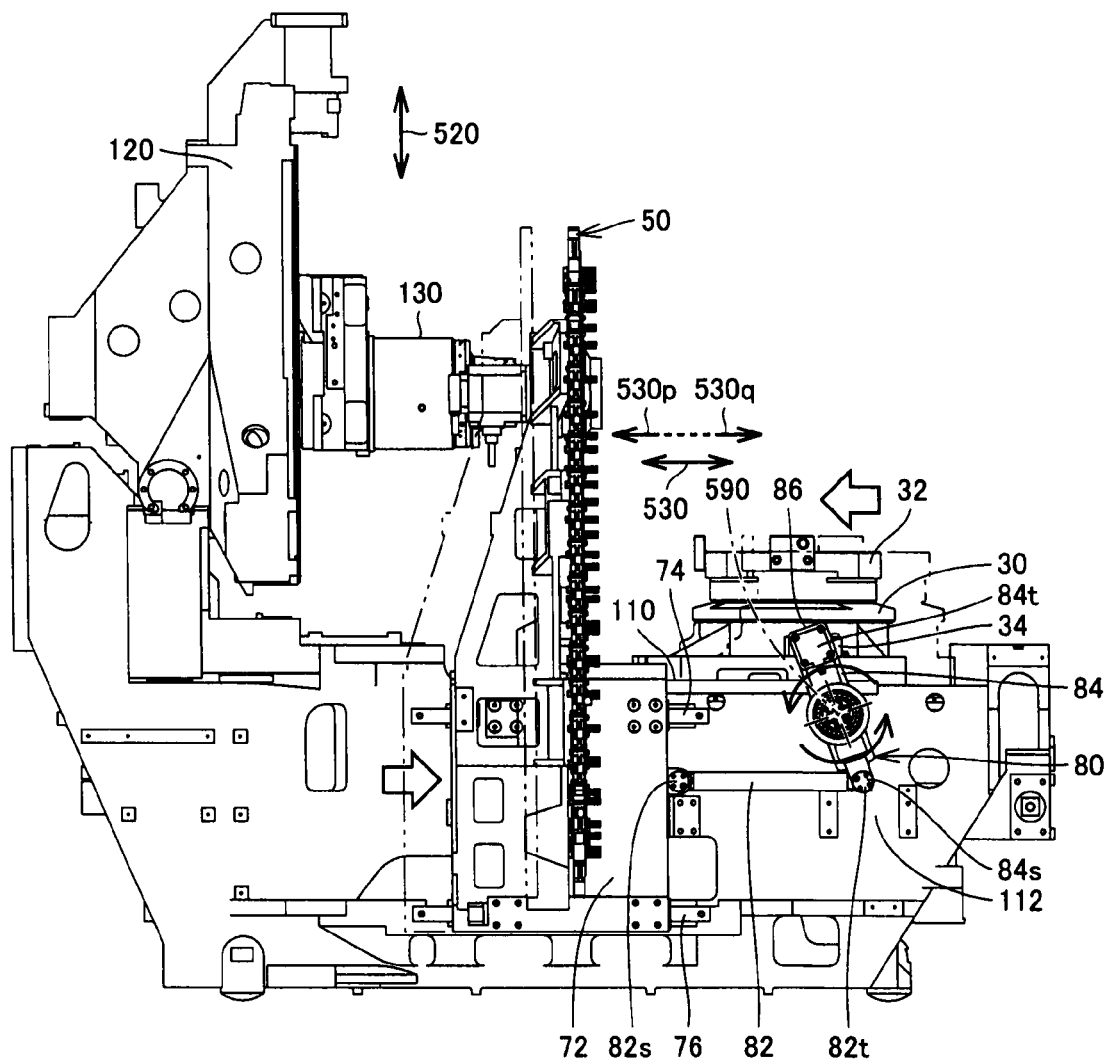
FIG. 6 is a side view of the FIG. 1 horizontal machining center having a tool drawn out of the spindle.

FIG. 6 is a side view of the FIG. 1 horizontal machining center having a tool drawn out of the spindle. Furthermore, with reference to FIG. 6, coupling mechanism 80 is provided to couple table 30 and magazine 50 together.

When table 30 is driven by a motor and thus slides along the Z-axis, coupling mechanism 80 transmits the movement of table 30 to magazine 50 to slide magazine 50 along the Z-axis. When table 30 slides in the direction indicated by arrow 530*p*, coupling mechanism 80 slides magazine 50 in the direction indicated by arrow 530*q*, and when table 30 slides in the direction indicated by arrow 530*q*, coupling mechanism 80 slides magazine 50 in the direction indicated by arrow 530*p*.

Coupling mechanism 80 is structured, as will more specifically be described hereinafter. Coupling mechanism 80 has a magazine stem 82, a table stem 84, and a coupling block 34.

In particular, as shown in FIG. 3, magazine stem 82 has one end 82*s* pivotably connected to magazine 50 (or magazine base 72). Magazine stem 82 and table stem 84 have the other end 82*t* and one end 84*s*, respectively, connected together pivotably. Magazine stem 82 extends from one end 82s toward the other end 82t in a direction generally parallel to the Z-axis.

Table stem 84 has the other end 84t with a cam follower 92 attached thereto. Coupling block 34 is secured to table 30. Coupling block 34 has a recess 36. Cam follower 92 is fitted into recess 36 to connect the table stem 84 other end 84t to table 30 pivotably. Table stem 84 extends from one end 84s to the other end 84t upwards. Table stem 84 is supported rotatably relative to bed 110 about a center axis 590 extending between one end 84s and the other end 84t. In the present embodiment, center axis 590 is set at a center between one end 84s and the other end 84t.

By this configuration, when table 30 moves in the direction indicated by arrow 530p (the direction allowing the table to approach spindle 20) table stem 84 swings about center axis 590. As table stem 84 thus swings, table stem 84 has the other end 84t displaced in the direction indicated by arrow 530p and one end 84s displaced in the direction indicated by arrow 530q (the direction allowing the table to move away from spindle 20). The displacement of the table stem 84 one end 84s is transmitted via magazine stem 82 to magazine base 72, and accordingly, magazine 50 slides in the direction indicated by arrow 530q.

On the other hand, when table 30 moves in the direction indicated by arrow 530q, table stem 84 swings about center axis 590. As table stem 84 thus swings, table stem 84 has the other end 84t displaced in the direction indicated by arrow 530q and one end 84s displaced in the direction indicated by arrow 530p. The displacement of the table stem 84 one end 84s is transmitted via magazine stem 82 to magazine base 72, and accordingly, magazine 50 slides in the direction indicated by arrow 530p.

Figure 7:
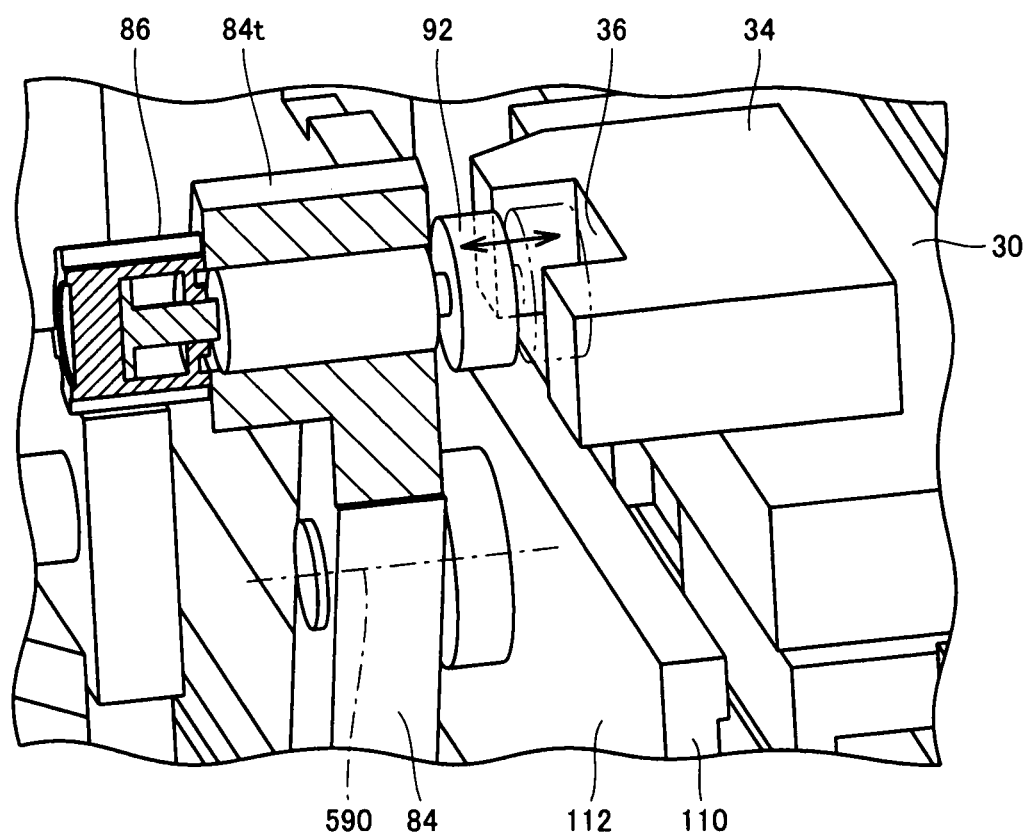
FIG. 7 is a cross section of an area shown in FIG. 1 and surrounded by a chain double-dashed line VII.

FIG. 7 is a cross section of an area shown in FIG. 1 and surrounded by a chain double-dashed line VII. With reference to FIG. 7, coupling mechanism 80 further has a driver implemented as an air cylinder 86. Air cylinder 86 is attached to table stem 84 at the other end 84t. Air cylinder 86 is provided such that as it is driven, it can push and pull cam follower 92 to and from recess 36. This selectively allows cam follower 92 to be fitted into recess 36, i.e., table 30 and magazine 50 to be coupled together, and cam follower 92 to be drawn out of recess 36, i.e., table 30 and magazine 50 to be uncoupled from each other.

Note that table 30 and magazine 50 are selectively coupled together/uncoupled from each other by a driver, which is not limited to air cylinder 86, and may for example be a hydraulic cylinder, a motor, or the like.

The FIG. 1 horizontal machining center 10 allows a tool attached to spindle 20 to be exchanged with another tool accommodated by magazine 50, as will be described hereinafter.

With reference to FIG. 1, a motor is driven to circulate chain 54 to position an available tool gripping claw 52 at a predetermined standby position. Spindle 20 and table 30 are moved to an ATC standby position. More specifically, spindle 20 is moved to a second origin position 200F which is the same position as the FIG. 2 positions 200A, 200C on the X-axis and is also the same position as tool exchange position 250 on the Y-axis. Table 30 is moved to an end of its Z-axis travel in the direction indicated by arrow 530q, i.e., the position of the origin of the Z-axis.

Figure 8:
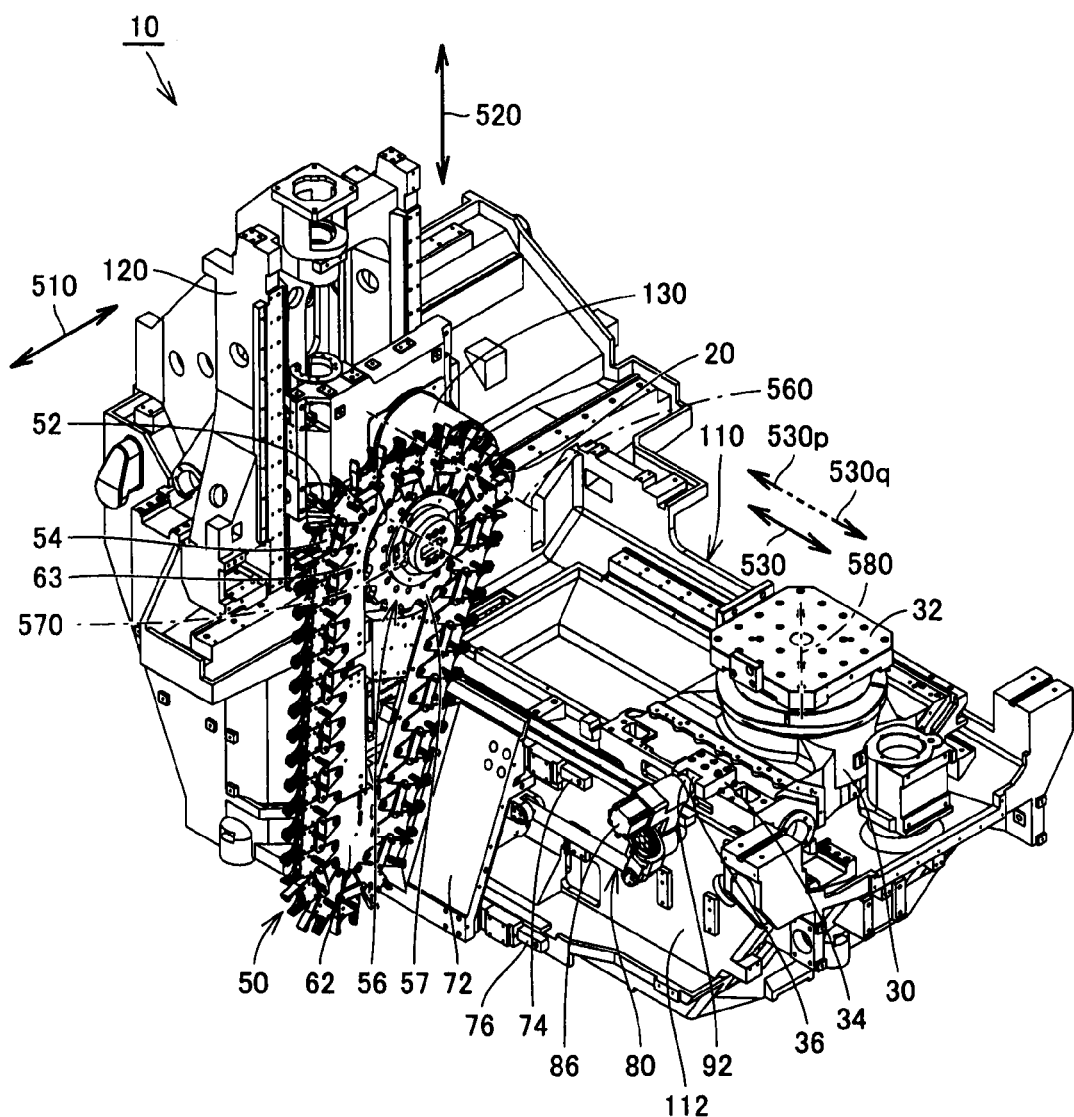
FIG. 8 is a perspective view of the FIG. 1 horizontal machining center before it has a tool drawn out of the spindle.

FIG. 8 is a perspective view of the FIG. 1 horizontal machining center before it has a tool drawn out of the spindle. With reference to FIG. 8, the FIG. 2 shutter 160 is opened. Air cylinder 86 is driven to fit cam follower 92 into recess 36 to couple table 30 and magazine 50 together. Spindle 20 is slid along the X-axis from the FIG. 2 second origin position 200F to tool exchange position 250. In doing so, tool 400 attached to spindle 20 is gripped by an available tool gripping claw 52 positioned at the standby position.

Figure 9:
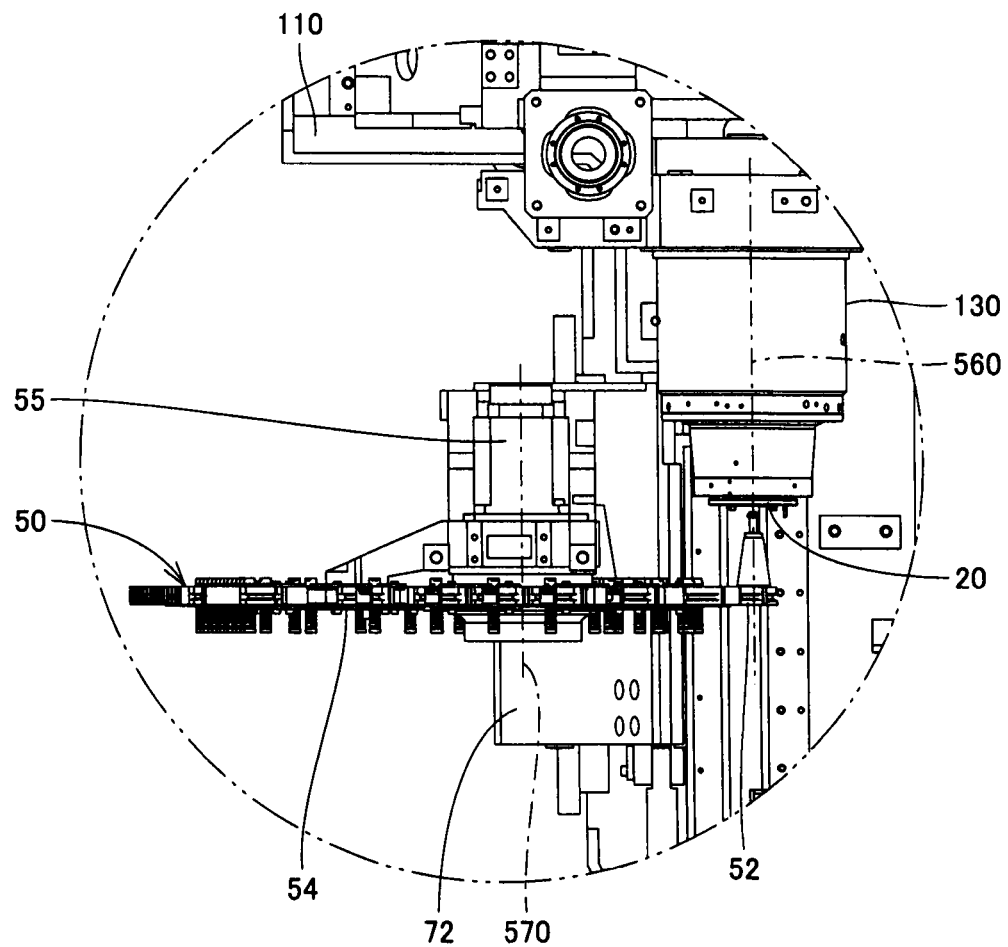
FIG. 9 is a plan view of the FIG. 1 horizontal machining center having a tool drawn out of the spindle.

FIG. 9 is a plan view of the FIG. 1 horizontal machining center having a tool drawn out of the spindle. With reference to FIGS. 6 and 9, the tool attached to spindle 20 is unclamped. Table 30 is slid in the direction indicated by arrow 530p to slide magazine 50 in the direction indicated by arrow 530q. The tool attached to spindle 20 is thus drawn out to the end face of spindle 20.

With reference to FIG. 8, the motor is driven to circulate chain 54 to position at the standby position tool gripping claw 52 gripping another tool. In doing so, the other tool gripped by tool gripping claw 52 is disposed on the axis of rotation of spindle 20, i.e., center axis 560. Table 30 is slid in the direction indicated by arrow 530q to slide magazine 50 in the direction indicated by arrow 530p. The other tool gripped by tool gripping claw 52 is thus inserted into spindle 20. The inserted tool is clamped. Air cylinder 86 is driven and cam follower 92 comes out of recess 36, and table 30 and magazine 50 are uncoupled.

Spindle 20 is moved from the FIG. 2 tool exchange position 250 to second origin position 200F. The FIG. 2 shutter 160 is closed, and exchanging tools thus completes.

Note that a means, such as an air cylinder, may be provided for pressing magazine 50 against bed 110 to hold magazine 50 at a fixed position after table 30 and magazine 50 are uncoupled.

Horizontal machining center 10 has a function and effect, as described hereinafter.

The present embodiment provides horizontal machining center 10 allowing table 30 and magazine 50 to be coupled together by coupling mechanism 80 to slide magazine 50 as table 30 moves in exchanging tools. This can eliminate the necessity of introducing an additional driving source for sliding magazine 50, and an auto tool changer (ATC) having a simple structure can be achieved.

Furthermore, magazine 50 is driven by a servomotor used to slide table 30, and moving magazine 50 in exchanging tools can be controlled with high precision. For example, in inserting a tool into spindle 20, magazine 50 can be moved fast immediately before the tool's shank 43 contacts the spindle's tapered face 42, and thereafter magazine 50 can be moved slowly.

Furthermore, coupling mechanism 80 transmits the movement of table 30 to magazine 50 along the Z-axis in an opposite direction, and in exchanging tools, moving table 30 in a direction allowing it to approach spindle 20, i.e., that indicated by arrow 530p, suffices. The tools can be exchanged without table 30 having an increased Z-axis travel. Furthermore, when tools are exchanged, table 30 and magazine 50 are moved in a direction allowing them to approach each other, and this can prevent magazine 50, table 30 and a workpiece on table 30 from having their centers of gravity positionally, significantly varying as the tools are exchanged. As their centers of gravity can be prevented from positional, significant variation, horizontal machining center 10 can be prevented from having a distorted structure otherwise attributed thereto.

Figure 10:
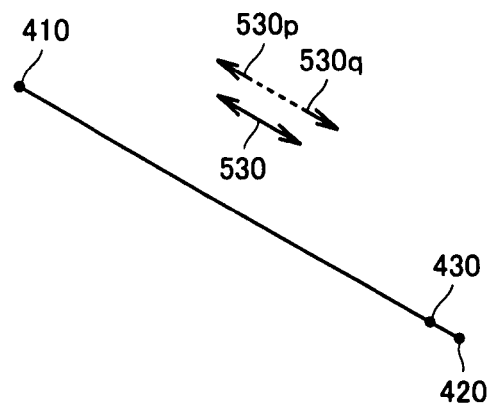
FIG. 10 schematically shows a travel of a table shown in FIG. 1.

FIG. 10 schematically shows a travel of the table shown in FIG. 1. The figure shows a position corresponding to an end of the Z-axis travel in the direction indicated by arrow 530q, i.e., the position 420 of the origin of the Z-axis, and a position 410 opposite to position 420 and corresponding to an end of the Z-axis travel in the direction indicated by arrow 530p. In the present embodiment, when tools are exchanged, table 30 is positioned at position 420 remotest from spindle 20 along the Z-axis and spindle 20 is positioned outside workpiece machining area 600 at tool exchange position 250. When a tool is drawn out, table 30 moves along the Z-axis to approach spindle 20, and despite that, the tool does not interfere with the workpiece or vice versa.

When preventing a tool from interfering with a workpiece and vice versa is considered, it is preferable to set the ATC standby position of table 30 at position 420.

However, the ATC standby position of table 30 may be offset from position 420 to a position 430 closer to spindle 20 than position 420 in order for example to offset the ATC standby position of table 30 from a pallet exchange position. It should be noted, however, that if the ATC standby position of table 30 is so set, it is preferable that the position be set closer to position 420 than position 410.

Furthermore, as shown in FIG. 2, in the present embodiment, chain 54 is laid out such that portion of chain 54 which is supported by chain supporting mechanism 56 projects toward tool exchange position 250. This structure allows tool gripping claw 52 at the standby position to be positioned more adjacent to spindle 20 and allows tools to be automatically exchanged (or ATCed) while spindle 20 travels a reduced distance. The ATC operation can thus be done in a reduced period of time. Furthermore, tool gripping claw 52 positioned at the standby position is supported by that portion of chain 54 wound on sprocket 57. This structure allows chain 54 to be significantly curved at the standby position so that tool gripping claw 52 positioned at the standby position can be spaced farther apart from tool gripping claws 52 adjacent thereto. This allows tools to be exchanged without the tools accommodated by magazine 50 interfering with spindle 20.

Furthermore, magazine 50 is attached via linear guides 74, 76 to bed 110 directly. This structure allows magazine 50 to be disposed more adjacent to spindle 20, and allows tools to be automatically exchanged (or ATCed) while spindle 20 travels a reduced distance. The ATC operation can thus be done in a reduced period of time.

The present invention in an embodiment provides horizontal machining center 10 thus described, having a structure summarized as follows: The present embodiment provides horizontal machining center 10 including: spindle 20 for rotating a tool about center axis 560 serving as a predetermined, horizontally extending axis; table 30 for securing a workpiece; magazine 50 for accommodating a tool; and coupling mechanism 80 coupling table 30 and magazine 50 together. Spindle 20 is driven in a plane (an X-Y plane) orthogonal to center axis 560. Table 30 is driven in a first direction parallel to center axis 560 (i.e., along the Z-axis) and allowing the table to approach spindle 20 (i.e., a direction indicated by arrow 530$p$) and a second direction parallel to center axis 560 (i.e., along the Z-axis) and allowing the table to move away from spindle 20 (i.e., a direction indicated by arrow 530$q$). Magazine 50 has tool gripping claw 52 serving as a plurality of grippers capable of gripping tools. Magazine 50 is movable in a direction parallel to center axis 560 (or along the Z-axis).

When table 30 is driven in one of the first and second directions, coupling mechanism 80 moves magazine 50 in the other of the first and second directions. When a tool attached to spindle 20 is removed from spindle 20, the tool attached to spindle 20 is gripped by tool gripping claw 52, and in that condition, table 30 is driven in the first direction. When a tool accommodated by magazine 50 is attached to spindle 20, the tool, gripped by tool gripping claw 52, is positioned on center axis 560, and in that condition, table 30 is moved in the second direction.

Horizontal machining center 10 of the present invention in an embodiment thus configured allows tools to be exchanged without introducing an additional driving source for sliding and thus moving magazine 50. Horizontal machining center 10 can thus have a simplified structure. Furthermore, horizontal machining center 10 allows tools to be exchanged without table 30 having an increased Z-axis travel. Horizontal machining center 10 can thus be prevented from having a bulky structure.

The present invention is applicable to a horizontal machining center equipped with an automatic tool exchange function.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

What is claimed is:

1. A horizontal machining center comprising:
   a spindle rotating a tool about a horizontal, predetermined axis and driven in a plane orthogonal to said predetermined axis;
   a table, driven in first and second directions parallel to said predetermined axis to approach and move away from said spindle, respectively, for securing a workpiece;
   a magazine having a plurality of grippers capable of gripping tools, and movable in a direction parallel to said predetermined axis for accommodating said tools; and
   a coupling mechanism for coupling said table and said magazine together and moving said magazine in one of said first and second directions when said table is driven in the other of said first and second directions, wherein:
   when a tool attached to said spindle is removed from said spindle, said tool attached to said spindle is gripped by one of said grippers, and in that condition, said table is driven in said first direction; and
   when a tool accommodated by said magazine is attached to said spindle, said tool accommodated by said magazine, gripped by one of said grippers, is positioned on said predetermined axis, and in that condition, said table is driven in said second direction.

2. The horizontal machining center according to claim 1, wherein:
   said magazine further has an annular chain coupling said plurality of grippers together and rotatably driven, and a plurality of chain supporting mechanisms for supporting said chain;
   said plurality of chain supporting mechanisms include at least one sprocket having said chain wound thereon;
   said plurality of chain supporting mechanisms have at least one thereof disposed in a vicinity of a tool exchange position of said spindle; and
   as seen along said predetermined axis, said chain supporting mechanism disposed in said vicinity of said tool exchange position of said spindle supports said chain to have a portion projecting toward said spindle.

3. The horizontal machining center according to claim 1, further comprising:
   a bed set on a plane bearing the horizontal machining center thereon, and said bed having said spindle and said table mounted thereon; and
   a guiding mechanism attached to said bed and supporting said magazine movably in a direction parallel to said predetermined axis.

* * * * *